Jan. 25, 1938.  M. V. O'DONNELL  2,106,411

MULTIPLE LEAF SPRING

Filed Jan. 14, 1936

INVENTOR
Michael V. O'Donnell
by
his attorneys

Patented Jan. 25, 1938

2,106,411

UNITED STATES PATENT OFFICE 2,106,411

MULTIPLE LEAF SPRING

Michael V. O'Donnell, Pittsburgh, Pa.

Application January 14, 1936, Serial No. 59,083

2 Claims. (Cl. 267—53)

This invention relates broadly to multiple leaf springs, and more particularly to heavy duty multiple leaf springs such as are employed on railway rolling stock, and especially locomotives. Such springs are made by superposing a plurality of spring leaves having interfitting complementary projections and recesses at intermediate portions thereof for holding the leaves against relative longitudinal displacement. A heated metal band is then introduced over the assembled leaves and about the portions thereof having the complementary projections and recesses and such band is pressed and shrunk about the leaves to maintain them in assembly.

One of the outside leaves of the leaf assembly has an outwardly facing projection and the opposite outside leaf has an outwardly facing recess. When the band is pressed and shrunk about the portions of the leaves having the complementary projections and recesses the outwardly facing projection in the first mentioned one of the outside leaves is forced into the metal of the band and forms an effective interengagement between such outside leaf and the band to hold the same against relative longitudinal displacement. However, in the pressing and shrinking on of the band the metal of the band does not enter the outwardly facing recess in the opposite outside leaf sufficiently to form an effective interengagement therebetween such as will maintain such leaf and the band against relative longitudinal displacement. The result is that, due to the stresses to which the spring is subjected in use, the leaves, and particularly those nearer the second above mentioned outside leaf, will be relatively displaced longitudinally. This brings about unbalance of the spring and in many cases ultimate failure thereof.

Various attempts have been made to obviate the disadvantage above pointed out, which has long been recognized as of primary concern in spring design and manufacture. Attempts have been made to force the metal of the band into the outwardly facing recess in the outside leaf, as by the use of a hammer and a round nosed tool, either when the metal is still hot or when it is cold. This has not proved effective, primarily because of the difficulty of determining the precise point at which to apply the striking force. Attempts were made to pass bolts through the spring leaves, but this practice was discontinued as it undesirably weakens the spring. Another proposal was to provide on the spring leaf having the outwardly facing recess next the band outward projections at the edges of the band to hold the band in place therebetween. However, this was found to have the effect of stiffening the leaf at the opposite edges of the band, thus reducing the effective length of the leaf and resulting in its breakage. After a number of attempts to use such a structure it was finally abandoned.

I have devised a very simple and effective way of holding against relative longitudinal displacement the leaves of a multiple leaf spring of the type above mentioned. At the face of the leaf assembly at which the outside leaf has an outwardly facing recess I provide positioning means preferably in the form of a plate having a projection entering such recess and interengaged or interlocked with the band to prevent relative longitudinal displacement therebetween. This provision effectively maintains the component parts of the spring in predetermined relative position longitudinally thereof and may be employed without undesirably increasing the cost of the spring or the difficulty of making it.

The positioning means preferably has portions engaging the opposed edges of the band to interlock the positioning means and band to hold them against relative longitudinal displacement. In making the spring the positioning means is preferably assembled with the heated band and such assembly introduced over the superposed leaves, whereafter the band is pressed against the leaf assembly and positioning means and cooled so that it is shrunk in place. When pressure is applied normal to the leaves the projection of the positioning means centers itself in the outwardly facing recess in the outer leaf and thus insures a proper assembly.

Other details, objects and advantages of the invention will become apparent as the following description of certain present preferred embodiments thereof proceeds.

In the accompanying drawing I have shown certain present preferred embodiments of the invention, in which—

Figure 1:
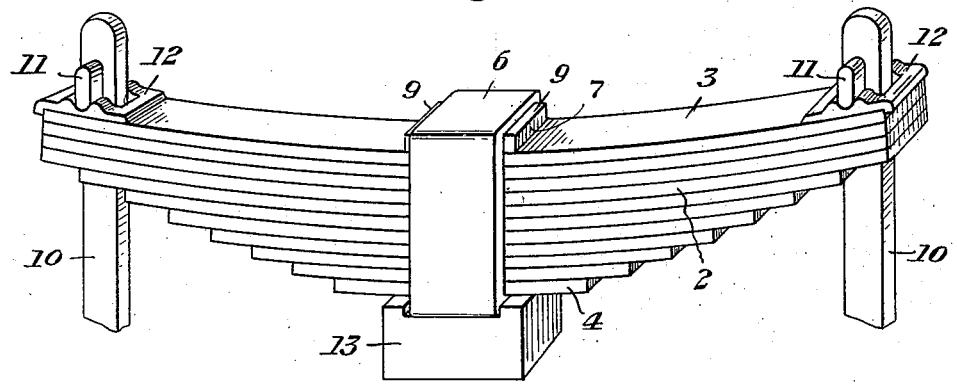
Figure 1 is a perspective view of a multiple leaf spring and its connections.
Figure 2:
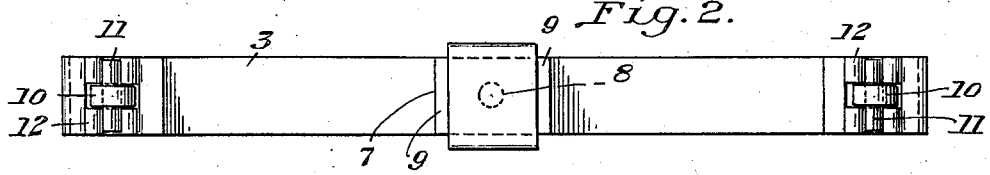
Figure 2 is a top plan view of the spring shown in Figure 1.
Figure 3:
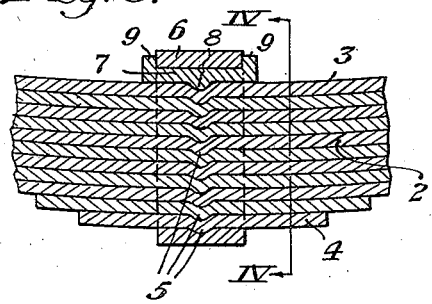
Figure 3 is a partial central vertical longitudinal cross-sectional view through the spring shown in Figure 1.
Figure 4:
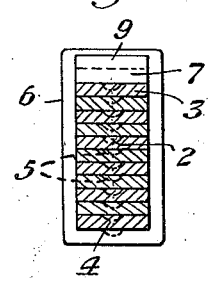
Figure 4 is a vertical transverse cross-sectional view taken on the line IV—IV of Figure 3.
Figure 5:
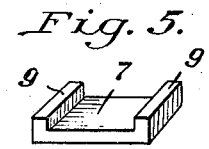
Figure 5 is a perspective view of the positioning plate used in the structure shown in Figure 1.
Figure 6:
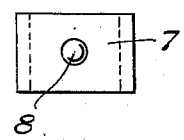
Figure 6 is a bottom plan view of the positioning plate shown in Figure 5.
Figure 7:
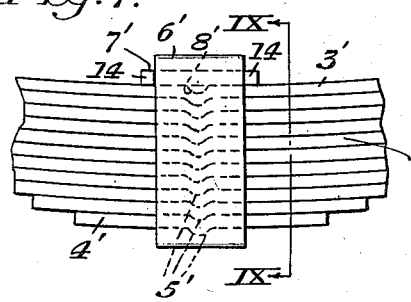
Figure 7 is a partial side elevational view of a spring similar to that of Figure 1 but employing a different form of positioning plate.
Figure 9:
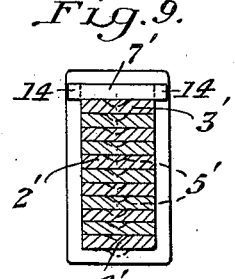
Figure 9 is a vertical transverse cross-sectional view taken on the line IX—IX of Figure 7.
Figure 10:
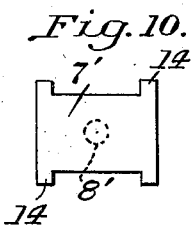
Figure 10 is a top plan view of the positioning plate used in the form of spring shown in Figures 7, 8 and 9.
Figure 8:
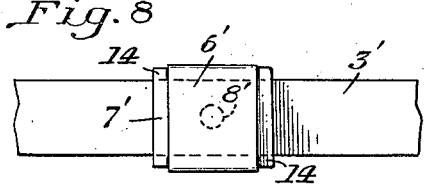
Figure 8 is a top plan view of the structure shown in Figure 7.

Referring now more particularly to the drawing and to Figures 1 to 6, inclusive, thereof, there is shown a multiple leaf spring made up of eleven superposed spring leaves the assembly of which is designated by reference numeral 2. The top leaf is designated 3 and the bottom leaf 4. The leaves may be of standard construction. Each of them has at a point intermediate its ends, and in the form shown substantially centrally thereof, a downwardly pressed portion 5 which provides a recess in the upper surface of the leaf and a projection or nib extending downwardly from the lower surface of the leaf. The nib in each leaf except the bottom leaf 4 is adapted to be received within the recess in the immediately underlying leaf as shown in Figure 3, the nibs and recesses being complementary in shape and serving to hold the leaves of the leaf assembly 2 against relative longitudinal displacement.

The leaf assembly 2 is held together by a metal clamping band 6 which is heated and then introduced thereabout over the portions of the leaves having the interfitting complementary nibs and recesses above described. In application of the band the downwardly projecting nib 5 in the bottom leaf 4 is forced into the metal of the band as shown in Figure 3, thus providing between the bottom leaf and the band an interengagement which is effective for holding the bottom leaf and band against relative longitudinal displacement.

As the metal of the band will not enter the recess in the top leaf 3 sufficiently to form an effective interengagement therebetween such as will maintain the top leaf and band against relative longitudinal displacement, I utilize positioning means, shown in Figures 1 to 6, inclusive, as being in the form of a plate 7, having a central downward projection or nib 8 similar to the nibs of the leaves and upwardly projecting flanges 9 at the opposite edges of the plate longitudinally of the spring. The plate may be either forged or cast, being shown in the drawing as a cast plate. If the plate is forged the nib 8 would be formed by pressing it downwardly out of the metal of the plate which would provide a corresponding recess in the upper surface of the plate, but such recess would not impair the efficiency of the plate.

In assembling the leaf assembly 2, the band 6 and the plate 7, the leaves of the leaf assembly are held tightly together, the plate 7 is introduced into the band into the position relatively thereto shown in Figures 1 to 4, inclusive, and the assembled band and plate are introduced longitudinally over the spring assembly to a position in which the interfitting nibs and recesses of the leaves are opposite the middle of the band, in which position the nib 8 of the plate 7 enters the recess in the upper leaf 3. The band is then pressed against the leaf assembly, preferably in a hydraulic press, pressure being applied both vertically and horizontally. In case there should be any slight misalignment between the nib in the plate 7 and the recess in the leaf 3 such nib and recess will automatically center themselves upon the application of pressure. The band is then cooled and thus shrunk about the leaf assembly and plate.

The multiple leaf spring thus produced effectively withstands the tendency created by the stresses imposed in use for the leaves to be displaced relatively to one another and for the leaves and band to be relatively displaced longitudinally of the spring. The interfitting complementary nibs and recesses in the leaves, the inner surface of the bottom of the band and the lower surface of the plate effectively hold them against relative longitudinal displacement. The plate is held against longitudinal displacement relatively to the band by the flanges 9 of the plate which extend upwardly outside the band and lie against the opposed edges thereof to interlock the plate and band.

Adjacent each end the spring assembly is vertically slotted, a rod 10 passing upwardly through each such slot and receiving a wedge 11 seated upon a saddle 12 carried upon the upper leaf 3. The load supported by the spring is carried by the rods 10. The lower portion of the band 6 is carried in a supporting block 13 which in the case of railway rolling stock is carried by the truck. Thus, a three-point suspension is formed between the lower central portion of the spring and the upper end portions thereof, the spring being substantially balanced therebetween. The spring is subjected to rough usage which tends to unbalance it and the unbalanced forces acting on it in use tend to cause relative movement of the leaves and relative movement between the leaves and band longitudinally of the spring, which tendency is counteracted by the construction above described.

Figures 7 to 10, inclusive, show a modified form of structure, and parts of Figures 7 to 10, inclusive, corresponding with parts of Figures 1 to 6, inclusive, are designated by like reference numerals each having a prime affixed. The form of Figures 7 to 10, inclusive, is the same as that of Figures 1 to 6, inclusive, except that the plate 7' instead of having upward flanges at its opposite ends longitudinally of the spring has lateral projections 14 at each end thereof longitudinally of the spring. These projections 14 lie against the opposed edges of the band to hold the plate and band against relative longitudinal movement, the function of the plate 7' therefore being the same as the function of the plate 7 but accomplished by a somewhat different structure.

While I have shown and described certain present preferred embodiments of the invention, it is to be distinctly understood that the same is not limited thereto but may be otherwise variously embodied within the scope of the following claims.

I claim:

1. A multiple leaf spring comprising an assembly of superposed spring leaves having interfitting complementary projections and recesses at intermediate portions thereof for holding the leaves against relative longitudinal displacement, a band disposed about said intermediate portions of the leaves for holding the leaves together, said band lying in contact with an outside leaf of said assembly and having projection and recess interengagement with said outside leaf for holding the band and said leaf against relative longitudinal displacement, and positioning means lying between and in contact with the opposite outside leaf of said assembly and the inner surface of the band, the positioning means having projection and recess interengagement with said second mentioned outside leaf for holding the positioning means and said leaf against relative longitudinal displacement, and the positioning means and band being interlocked to hold them against relative longitudinal displacement.

2. A multiple leaf spring comprising an assembly of superposed spring leaves having interfitting complementary projections and recesses at intermediate portions thereof for holding the leaves against relative longitudinal displacement, a band disposed about said intermediate portions of the leaves for holding the leaves together, said band lying in contact with an outside leaf of said assembly and having projection and recess interengagement with said outside leaf for holding the band and said leaf against relative longitudinal displacement, and positioning means lying between and in contact with the opposite outside leaf of said assembly and the inner surface of the band, the positioning means having projection and recess interengagement with said second mentioned outside leaf for holding the positioning means and said leaf against relative longitudinal displacement, and the positioning means having portions engaging the edges of the band whereby to hold the positioning means and band aginst relative longitudinal displacement.

MICHAEL V. O'DONNELL.